United States Patent [19]
Brassart et al.

[11] Patent Number: 6,061,413
[45] Date of Patent: May 9, 2000

[54] NUCLEAR STEAM SUPPLY TEMPERATURE MEASUREMENT SYSTEM AND METHOD

[75] Inventors: Gary Arthur Brassart, Oakmont; Charles Raymond Sterrett, O'Hara; Jagannathan S. Srinivasan, Murrysville, all of Pa.

[73] Assignee: Westinghouse Electric Company LLC, Pittsburgh, Pa.

[21] Appl. No.: 08/617,144

[22] Filed: Mar. 18, 1996

[51] Int. Cl.[7] .......................... G21C 17/00; G21C 17/02
[52] U.S. Cl. .................. 376/247; 376/216; 376/245; 376/259; 374/100; 374/110; 374/115
[58] Field of Search ..................... 376/247, 245, 376/259, 216

[56] References Cited

U.S. PATENT DOCUMENTS

| | | | |
|---|---|---|---|
| 3,998,693 | 12/1976 | Musick | 176/20 R |
| 4,778,538 | 10/1988 | Lyman | 136/230 |
| 4,801,421 | 1/1989 | Ackerson et al. | 376/249 |
| 4,901,061 | 2/1990 | Twerdochlib | 340/604 |
| 4,926,364 | 5/1990 | Brotherton | 364/581 |
| 5,024,802 | 6/1991 | Srinivasan | 376/258 |
| 5,253,190 | 10/1993 | Srinivasan | 364/581 |
| 5,271,045 | 12/1993 | Scarola et al. | 376/216 |
| 5,586,156 | 12/1996 | Gaubatz | 376/216 |

FOREIGN PATENT DOCUMENTS

| | | | |
|---|---|---|---|
| 21765522 | 2/1973 | France | 376/247 |
| 493142 | 1/1992 | France | 376/247 |
| 3113697 | 2/1982 | Germany | 376/247 |

*Primary Examiner*—Charles T. Jordan
*Assistant Examiner*—Jack Keith

[57] ABSTRACT

A temperature measurement system includes, for each of two nuclear steam supply system (NSSS) loops, four temperature sensors each of which provides a value of the temperature of reactor coolant flowing in the NSSS hot leg of the loop; a mechanism for determining, for the hot leg, a first bias value associated with a first pair of the temperature sensors and a second bias value associated with a second pair of the temperature sensors from the value of the temperature of the reactor coolant of each of the temperature sensors; a mechanism for averaging the first bias value and the values of the first pair of the temperature sensors to determine a first average temperature therefrom; and a mechanism for averaging the second bias value and the values of the second pair of the temperature sensors to determine a second average temperature therefrom, whereby two separate average temperatures of the temperature of the reactor coolant are determined for each of the two loops.

21 Claims, 3 Drawing Sheets

NUCLEAR STEAM SUPPLY TEMPERATURE MEASUREMENT SYSTEM AND METHOD

BACKGROUND OF THE INVENTION

1. Field of the Invention

This invention is directed to a temperature measurement system and, more particularly, to such a system for a two-loop nuclear steam supply system (NSSS). The invention is further directed to a temperature measurement system and method for a NSSS loop.

BACKGROUND INFORMATION

In a conventional temperature measurement system for a pressurized water reactor (PWR), thermowell-mounted RTD's (i.e., temperature dependent resistances) are installed directly in the hot leg and cold leg pipes of the nuclear steam supply system (NSSS). Three RTD's are mounted at 120 degree intervals around the circumference of the hot leg pipe. Readings from these three RTD's are employed to provide an average measurement of the hot leg temperature. Another RTD is employed to provide a single measurement of the cold leg temperature.

With this design, a protection set for one loop of the NSSS includes three hot leg RTD's, which are employed to provide one average hot leg temperature, and one cold leg RTD. In a four-loop plant, for example, there are four protection sets. Similarly, there are three protection sets in a three-loop plant. However, under current protection system design requirements, two protection sets provide inadequate protection logic in a two-loop plant. Instead, four protection sets (i.e., two protection jets per loop) are desired.

With the design of the existing protection set three new penetrations must be cut in each hot leg to provide four separate protection sets in a two-loop plant. Accordingly, there is room for improvement in terms of the amount of instrumentation as well as the cost and time required by the corresponding instrumentation installation activity.

There is a need, therefore, for an improved system and method for temperature measurement in a NSSS which does not double the requisite instrumentation for the measurement system.

There is also a need for an improved temperature measurement system and method in a NSSS which reduces instrumentation and installation costs.

There is a more particular need for such a system and method which minimizes the number of penetrations in a NSSS.

SUMMARY OF THE INVENTION

These and other needs are satisfied by the invention which is directed to a temperature measurement system for a nuclear steam supply system including, for each of two nuclear steam supply loops, four temperature sensing means each of which provides a value of the temperature of reactor coolant flowing in a leg of the loop; means for determining, for the leg, a first bias value associated with a first pair of the temperature sensing means and a second bias value associated with a second pair of the temperature sensing means from the value of the temperature of the reactor coolant of each of the temperature sensing means; means for averaging the first bias value and the values of the first pair of the temperature sensing means to determine a first average temperature therefrom; and means for averaging the second bias value and the values of the second pair of the temperature sensing means to determine a second average temperature therefrom, whereby two separate average temperatures of the temperature of the reactor coolant are determined for each of the two loops.

As another aspect of the invention, a temperature measurement system for a nuclear steam supply system includes, for each of two nuclear steam supply loops, four temperature sensing means each of which provides a value of the temperature of reactor coolant flowing in a leg of the loop; means for determining, for the leg, an average of the value of the temperature for each of the temperature sensing means; first means for averaging (a) a first function of the average of the value of the temperature for each of the temperature sensing means, and (b) the values of a first pair of the temperature sensing means to determine a first average temperature therefrom; and second means for averaging (c) a second function of the average of the value of the temperature for each of the temperature sensing means, and (d) the values of a second pair of the temperature sensing means to determine a second average temperature therefrom, whereby two separate average temperatures of the temperature of the reactor coolant are determined for each of the two loops.

As a further aspect of the invention, a temperature measurement system for a nuclear steam supply system includes plural temperature sensing means each of which provides a value of the temperature of reactor coolant of a nuclear steam supply system loop; means for providing a first bias value associated with a first plurality of the temperature sensing means and a second bias value associated with a second plurality of the temperature sensing means; means for averaging the first bias value and the values of the first plurality of the temperature sensing means to determine a first average temperature therefrom; and means for averaging the second bias value and the values of the second plurality of the temperature sensing means to determine a second average temperature therefrom, whereby two separate average temperatures of the temperature of the reactor coolant are determined for the loop.

As a still further aspect of the invention, a method for determining temperature measurements for a nuclear steam supply system loop includes the steps of employing a plurality of sensors to sense the temperature of the reactor coolant; sensing plural values of the temperature of the reactor coolant from each of the sensors; determining a first bias value associated with a first plurality of the sensors and a second bias value associated with a second plurality of the sensors; sensing a value of the temperature of the reactor coolant from each of the sensors; averaging the first bias value and the value of the temperature of the reactor coolant from the first plurality of the sensors and determining a first average temperature therefrom; and averaging the second bias value and the value of the temperature of the reactor coolant from the second plurality of the sensors and determining a second average temperature therefrom, whereby two separate average temperatures of the temperature of the reactor coolant are determined for the loop.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
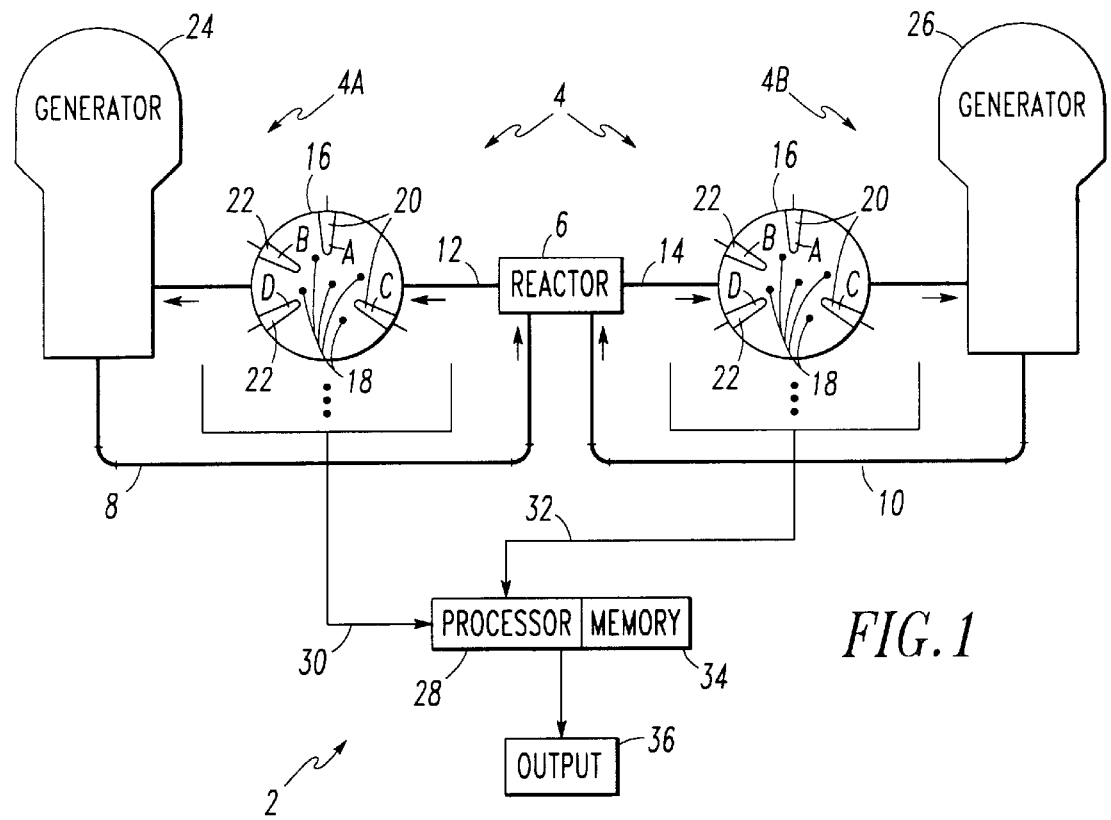
FIG. 1 is a block diagram of a temperature measurement system having a processor for a two-loop pressurized water reactor (PWR) nuclear steam supply system (NSSS) in accordance with the present invention.

Referring to FIG. 1, a temperature measurement system 2 for a two-loop pressurized water reactor (PWR) nuclear steam supply system (NSSS) 4 is illustrated. A nuclear reactor 6 receives reactor coolant, such as coolant water, through "cold leg" pipes 8,10 which exits the reactor 6 on corresponding "hot leg" pipes 12,14. For purpose of clarity, each of the hot legs 12,14 is simplistically exploded in part to show that there are four temperature sensors A,B,C,D spaced apart on a circular plane 16 which is normal to the flow of the reactor coolant 18 therein. In the exemplary embodiment, each of the hot legs 12,14 has four scoop penetrations providing a total of four thermowell-mounted RTD's (i.e., devices having a resistance which changes as a function of temperature) therein, although the invention is applicable to any type of temperature sensor.

Figure 2:
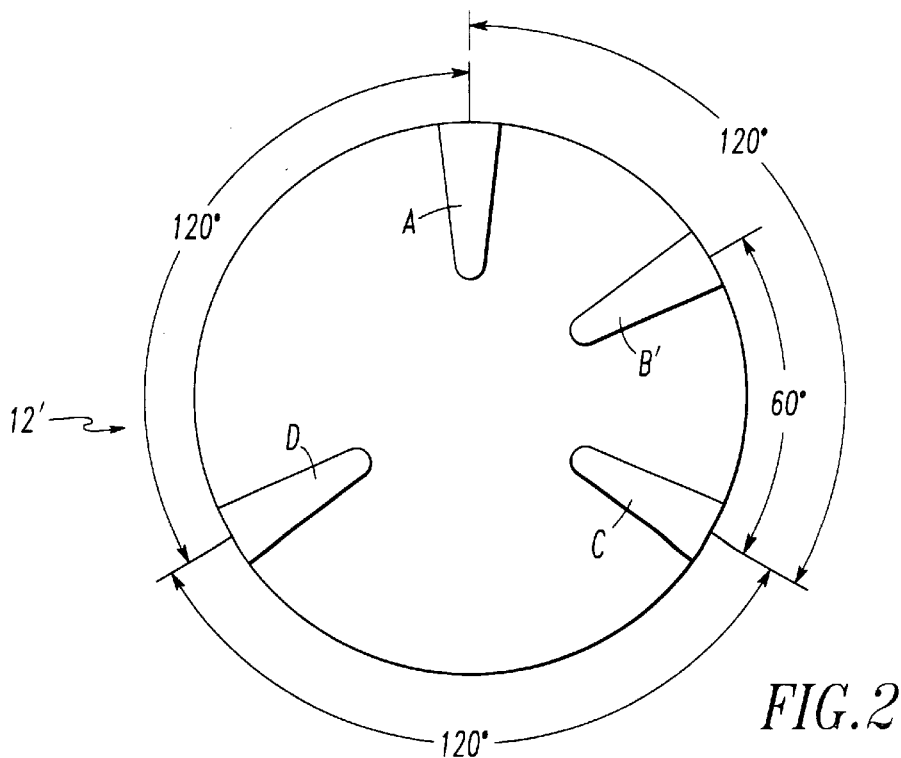
FIG. 2 is a vertical sectional view of a hot leg having sensors positioned in accordance with an alternative embodiment of the invention.

The temperature sensors A,B,C,D are circumferentially spaced about the circular plane 16 of each of the hot legs 12,14. The sensors A,C are separated by about 120 degrees and the sensors B,D are separated by about 60 degrees. The sensor D is separated by about 120 degrees from each of the sensors A,C. Alternatively, as shown in FIG. 2, the sensors A,C of hot leg 12' are separated by about 120 degrees and the sensors B',D are separated by about 180 degrees. The sensor B' is separated by about 60 degrees from each of the sensors A,C.

Continuing to refer to FIG. 1, the four temperature sensors A,B,C,D provide two separate protection sets 20,22 for each of the hot legs 12,14. Sensors A and C form protection set 20 and sensors B and D form protection set 22. An example of the hot leg housing for temperature sensors A,B,C,D is disclosed in U.S. Pat. No. 5,253,190 which is incorporated by reference herein. The reactor coolant 18 flowing through the hot legs 12,14 enters steam generators 24,26 and leaves such steam generators in a cooler state through the cold legs 8,10, respectively.

The temperature measurement system 2 includes two sets of temperature sensors A,B,C,D for the hot legs 12,14 and a processor 28 such as a digital computer. Based upon the sensed values, as determined over inputs 30,32 from the respective loops 4A,4B for the two sets of temperature sensors A,B,C,D to the processor 28, such processor produces and stores in memory 34 values of the temperature of the reactor coolant 18 in the hot legs 12,14 for output display or indication 36. Although the exemplary processor 28 and memory 34 are digital, the invention is applicable to temperature measurement systems employing any analog or digital processor. The invention is further applicable to the production of values of the temperature of the reactor coolant 18 for use in control and/or protection systems for the reactor 6.

Figure 3:
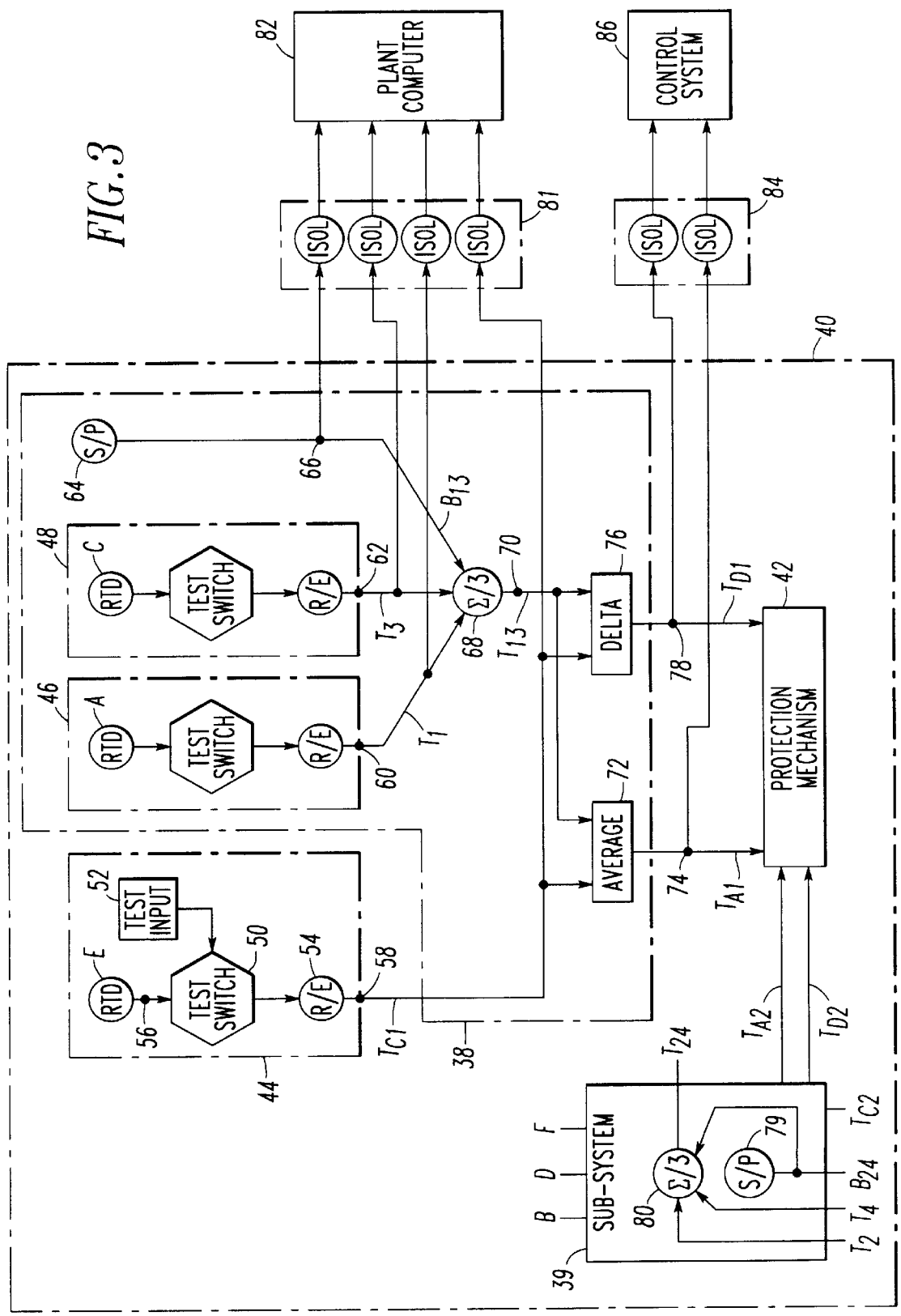
FIG. 3 is a block diagram of a PWR protection system having temperature measurement sub-systems in accordance with an alternative embodiment of the invention.

FIG. 3 illustrates an alternative temperature measurement sub-system 38 for protection set 20 of hot leg 12 of FIG. 1 and a temperature measurement sub-system 39, similar to the sub-system 38, for protection set 22 of hot leg 12. Also referring to FIG. 1, the temperature measurement sub-systems 38,39 form part of a protection system 40 having protection mechanism 42 and two sub-systems (not shown) for protection sets 20,22 of hot leg 14. The protection system 40 also includes a "cold leg" temperature sensor 44 for cold leg 8 and a similar cold leg temperature sensor (not shown) for cold leg 10. The temperature measurement sub-system 38 includes temperature sensors 46,48 for protection set 20 of hot leg 12.

The exemplary temperature sensor 44 includes an RTD E for the cold leg 8, a test switch 50 having a test input 52, and a resistance-to-voltage (R/E) converter 54, although the invention is applicable to any temperature sensor which converts a temperature to an analog or digital temperature value. The RTD E provides a resistance at node 56 dependent on the temperature of the reactor coolant in cold leg 8. Normally, the test switch 50 connects the node 56 to the R/E 54 which, in turn, provides a temperature value $T_{C1}$, such as a voltage, for cold leg 8 at node 58. Otherwise, under test conditions, the test switch 50 bypasses the RTD output 56 and connects the resistance of the test input 52 to the R/E 54.

The temperature sensors 46,48 include RTD's A,C and produce temperature values $T_1,T_3$, such as voltages, at nodes 60,62, respectively, for protection set 20 of hot leg 12. A setpoint (S/P) device 64, such as a potentiometer connected to a voltage source, outputs a configurable bias value $B_{13}$, such as a voltage, at node 66. Connected to the nodes 60,62,66 is an averaging device ($\Sigma/3$) 68 which averages the bias value $B_{13}$ and the temperature values $T_1,T_3$ to produce an average temperature value $T_{13}$ for protection set 20 of hot leg 12 at node 70.

An averaging device 72 averages the temperature value $T_{C1}$ of the cold leg 8 at node 58 with the average temperature value $T_{13}$ at node 70 and provides an average temperature value $T_{A1}$ at node 74. A difference device (DELTA) 76 determines the difference between the hot leg average temperature value $T_{13}$ and the cold leg temperature value $T_{C1}$ and provides a delta-temperature $T_{D1}$ at node 78. In turn, the devices 72,76 provide the average $T_{A1}$ and delta $T_{D1}$ temperatures to the protection mechanism 42.

Although the exemplary temperature measurement sub-system 38 includes a setpoint device 64 for setting the bias value $B_{13}$, as discussed in greater detail below in connection with FIG. 4, the invention is also applicable to temperature measurement systems which calculate the bias value $B_{y3}$. The setting of the bias value $B_{13}$ is determined as follows. First, a plurality (N) of sensor temperature values $T_1(i), T_2(i), T_3(i), T_4(i)$ (where "i" ranges from 1 to N) are collected from each of the temperature sensors A,B,C,D, respectively. For example, N sensor temperature values from each of the temperature sensors A,B,C,D are collected periodically over a period of time. Then, sensor average temperature values $T_{H1}, T_{H2}, T_{H3}, T_{H4}$ are determined for the temperature sensors A,B,C,D as shown in Equations 1–4, respectively.

$$T_{H1} = \frac{\Sigma(T_1(i))}{N} \qquad \text{Eq. (1)}$$

$$T_{H2} = \frac{\Sigma(T_2(i))}{N} \qquad \text{Eq. (2)}$$

$$T_{H3} = \frac{\Sigma(T_3(i))}{N} \qquad \text{Eq. (3)}$$

$$T_{H4} = \frac{\Sigma(T_4(i))}{N} \qquad \text{Eq. (4)}$$

where:
   $T_1(i), T_2(i), T_3(i), T_4(i)$ are plural sensor temperature values from the temperature sensors A,B,C,D, respectively; and N=number of sensor temperature values for each of the sensors A,B,C,D.

Next, a loop average temperature value $T_{HAVE}$ is determined from Equation 5 by averaging the sensor average temperature values $T_{H1},T_{H2},T_{H3},T_{H4}$.

$$T_{HAVE} = \frac{(T_{H1} + T_{H2} + T_{H3} + T_{H4})}{4} \qquad \text{Eq. (5)}$$

Then, the bias value $B_{13}$ for the temperature sensors A,C of protection set 20, as defined by Equation 6, is determined from Equation 7, although the invention is applicable to other methods or mechanisms for determining bias values and determining average temperature values therefrom.

$$T_{HAVE} = \frac{(T_{H1} + T_{H3} + B_{13})}{3} \qquad \text{Eq. (6)}$$

$$B_{13} = 3T_{HAVE} - (T_{H1} + T_{H3}) \qquad \text{Eq. (7)}$$

Finally, the bias value $B_{13}$ is established at node 66 by suitable adjustment of the setpoint device 64.

The averaging device 68 averages the bias value $B_{13}$, which as shown in Equations 5 and 7 is a function of the sensor average temperature values $T_{H1},T_{H2},T_{H3},T_{H4}$, and the temperature values $T_1,T_3$ of the temperature sensors A,C, respectively, to determine the average temperature value $T_{13}$ therefrom. In a similar manner as discussed above for the temperature measurement sub-system 38 for protection set 20 of hot leg 12, each of the protection sets 20,22 of the loops 4A,4B includes two hot leg sensor temperature values and one bias value.

In a manner similar to sub-system 38, the temperature measurement sub-system 39 includes RTD's B,D which produce temperature values $T_2,T_4$, respectively, for protection set 22 of hot leg 12 and RTD F which produces temperature value $T_{C2}$ for cold leg 8. The sub-system 39 also includes a setpoint (S/P) device 79, such as a potentiometer connected to a voltage source, which outputs a configurable bias value $B_{24}$, and an averaging device ($\Sigma/3$) 80 which produces an average temperature value $T_{24}$ for protection set 20 of hot leg 12. The average temperature value $T_{24}$ is determined from the average of the bias value $B_{24}$, which is a function of the sensor average temperature values $T_{H1}$, $T_{H2},T_{H3},T_{H4}$, and the temperature values $T_2,T_4$ of the temperature sensors B,D, respectively. As discussed above, the bias values $B_{13},B_{24}$ are a function of $T_{HAVE}$ which, in turn, is determined from the sensor average temperature values $T_{H1},T_{H2},T_{H3},T_{H4}$ of the respective temperature sensors A,B, C,D for the corresponding one of the loops 4A,4B.

A plurality of isolators 81 interconnect the signals $T_{C1}$, $T_1,T_3,B_{13}$ at nodes 58,60,62,66, respectively, to a plant computer 82 for calculation (e.g., averaging the bias value $B_{13}$ and the temperature values $T_1,T_3$ to calculate or confirm the average temperature value $T_{13}$). A plurality of isolators 84 interconnect the signals $T_{A1},T_{D1}$ at nodes 74,78, respectively, to a control system 86. Other isolators (not shown) interconnect the signals $T_{C2},T_2,T_4,B_{24}$ to the plant computer 82 and further isolators (not shown) interconnect the signals $T_{A2},T_{D2}$ to the control system 86.

Figure 4:
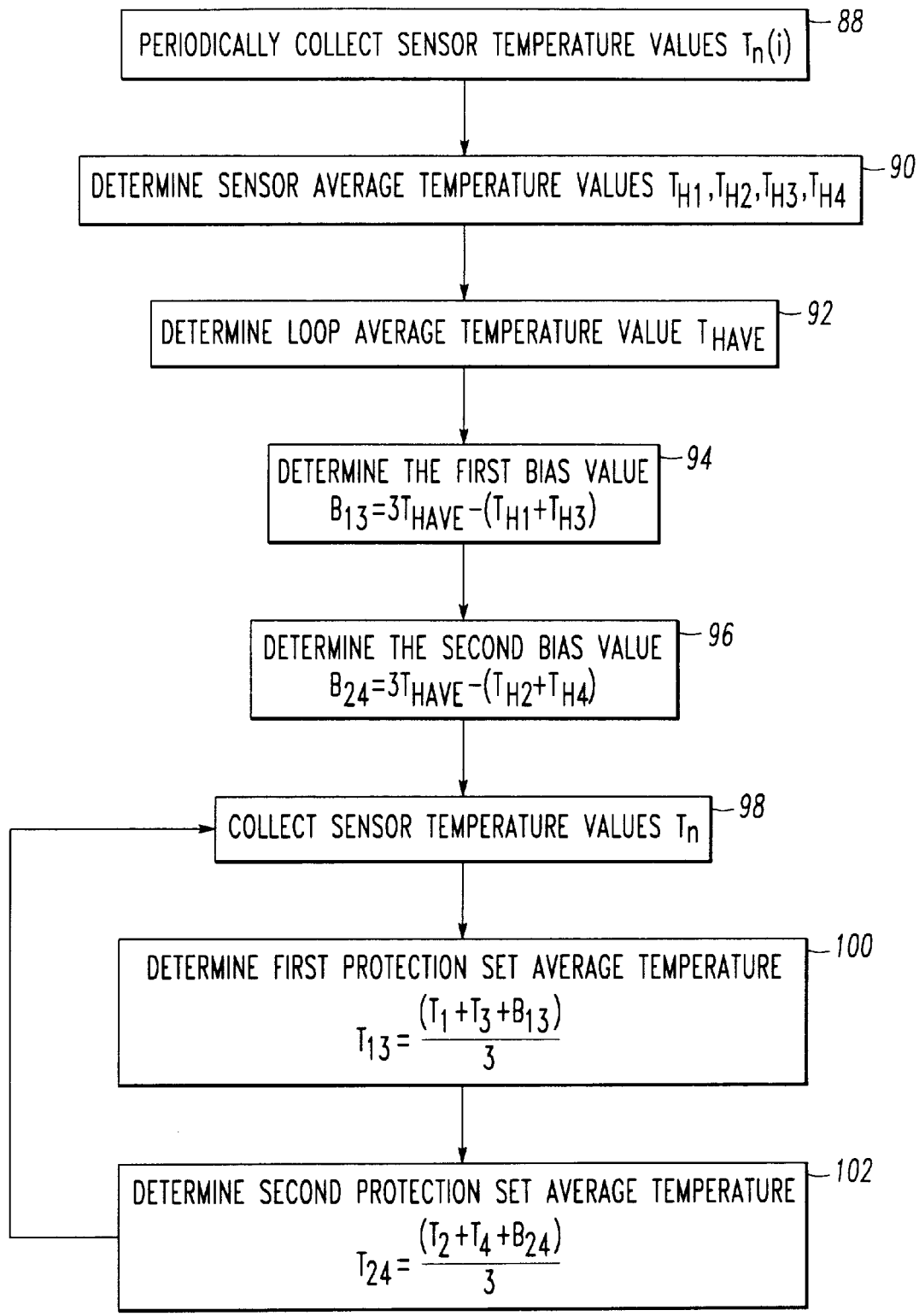
FIG. 4 is a flowchart for execution by the processor of FIG. 1.

Referring to FIG. 4, the exemplary flowchart is executed by the processor 28 for one of the loops 4A,4B of FIG. 1. Also referring to FIG. 1, at step 88, a plurality (N) of sensor temperature values $T_1(i),T_2(i),T_3(i),T_4(i)$ are collected from each of the temperature sensors A,B,C,D, respectively. For example, after a refueling operation of the reactor 6, an exemplary 13 sensor temperature values from each of the temperature sensors A,B,C,D are collected about every 5 minutes over about a one hour period, although the invention is applicable to any number of sensor temperature values collected over any time period. Next, at step 90, the sensor average temperature values $T_{H1},T_{H2},T_{H3},T_4$ are determined for each of the temperature sensors A,B,C,D as shown above in Equations 1–4, respectively. Next, at step 92, the loop average temperature value $T_{HAVE}$ is determined from Equation 5, above, by averaging the sensor average temperature values $T_{H1},T_{H2},T_{H3},T_4$. Then, at step 94, the bias value $B_{13}$ for the temperature sensors A,C of protection set 20 is determined from Equation 7, above.

As shown in Equation 6, above, the bias value $B_{13}$ is defined such that the average of bias value $B_{13}$ and the sensor average temperature values $T_{H1},T_3$ for respective temperature sensors A,C, is equal to the loop average temperature value $T_{HAVE}$ determined at step 92. The bias value $B_{13}$, as shown in Equation 7, above, is determined as a function of the loop average temperature value $T_{HAVE}$ and the sensor average temperature values $T_{H1},TH_3$ for respective temperature sensors A,C.

Next, in a similar manner as step 94, the bias value $B_{24}$, defined by Equation 8, for the temperature sensors B,D of protection set 22 is determined from Equation 9 at step 96.

$$T_{HAVE} = \frac{(T_{H2} + T_{H4} + B_{24})}{3} \qquad \text{Eq. (8)}$$

$$B_{24} = 3T_{HAVE} - (T_{H2} + T_{H4}) \qquad \text{Eq. (9)}$$

Although steps 88–96 are typically performed after refueling the reactor 6, the invention is applicable to recalculation of the bias values $B_{13},B_{24}$ at other times (e.g., at any aperiodic or periodic interval such as once every month). At step 98, sensor temperature values $T_1,T_2,T_3,T_4$ are collected from the temperature sensors A,B,C,D, respectively. Then, at step 100, a protection set average temperature value $T_{13}$ for protection set 20 is determined from Equation 10.

$$T_{13} = \frac{(T_1 + T_3 + B_{13})}{3} \qquad \text{Eq. (10)}$$

At step 102, in a similar manner as step 100, a protection set average temperature value $T_{24}$ for protection set 22 is determined from Equation 11 before repeating step 98 after a suitable delay.

$$T_{24} = \frac{(T_2 + T_4 + B_{24})}{3} \qquad \text{Eq. (11)}$$

The protection set average temperature values $T_{13},T_{24}$ for protection set 22 are determined in a similar manner discussed above for protection set 20.

The exemplary temperature measurement system 2 of FIG. 1 and sub-systems 38,39 of FIG. 3 simplify installation of the requisite sensors for the protection sets 20,22 while meeting the current protection system design requirements. In the exemplary embodiments, two hot leg temperature sensors are employed per protection set and two protection sets are employed per hot leg.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is Claimed is:

1. A temperature measurement system for a nuclear steam supply system having two loops, each of said two loops having reactor coolant flowing in a leg, the reactor coolant having a temperature, said temperature measurement system comprising:

for each of said two loops:
four temperature sensing means, each of said temperature sensing means for providing a value of the temperature of the reactor coolant in a corresponding one of the legs;
means for determining, for the corresponding leg, a first bias value associated with a first pair of said temperature sensing means and a second bias value associated with a second pair of said temperature sensing means from the value of the temperature of the reactor coolant of each of said temperature sensing means;
means for averaging the first bias value and the values of said first pair of said temperature sensing means to determine a first average temperature therefrom; and
means for averaging the second bias value and the values of said second pair of said temperature sensing means to determine a second average temperature values therefrom,
whereby two separate average temperatures of the temperature of the reactor coolant are determined for each of said two loops.

2. The measurement system as recited in claim 1 wherein said temperature sensing means are circumferentially spaced about a corresponding one of the legs.

3. The measurement system as recited in claim 2 wherein said first pair of said temperature sensing means are separated by about 120 degrees and said second pair of said temperature sensing means are separated by about 180 degrees.

4. The measurement system as recited in claim 3 wherein one of said second pair of said temperature sensing means is separated by about 60 degrees from each one of said first pair of said temperature sensing means.

5. The measurement system as recited in claim 2 wherein said first pair of said temperature sensing means are separated by about 120 degrees and said second pair of said temperature sensing means are separated by about 60 degrees.

6. The measurement system as recited in claim 5 wherein one of said second pair of said temperature sensing means is separated by about 120 degrees from each one of said first pair of said temperature sensing means.

7. The measurement system as recited in claim 1 wherein said means for determining includes:
means for collecting a plurality of values from each of said temperature sensing means;
means for averaging said plurality of values from each of said temperature sensing means to determine an average temperature for each of said temperature sensing means; and
means for determining the first and second bias values from the average temperatures.

8. The measurement system as recited in claim 7 wherein said means for determining the first and second bias values includes:
means for averaging said plurality of values from each of said temperature sensing means to determine an average temperature for the corresponding leg; and
means for determining each of the first and second bias values as a function of the average temperature for the corresponding leg and the average temperatures for two of said temperature sensing means.

9. The measurement system as recited in claim 8 wherein said means for determining each of the first and second bias values includes:
means for determining the product of three times the average temperature for the corresponding leg;
means for determining a first sum of the average temperatures for said first pair of said temperature sensing means;
means for determining the first bias value as said product less the first sum;
means for determining a second sum of the average temperatures for said second pair of said temperature sensing means; and
means for determining the second bias value as said product less the second sum.

10. A temperature measurement system for a nuclear steam supply system having two loops, each of said two loops having reactor coolant flowing in a leg, the reactor coolant having a temperature, said temperature measurement system comprising:

for each of said two loops:
four temperature sensing means, each of said temperature sensing means for providing a value of the temperature of the reactor coolant in a corresponding one of the legs;
means for determining, for the corresponding leg, an average of the value of the temperature for each of said temperature sensing means;
first means for averaging:
(a) a first function of the average of the value of the temperature for each of said temperature values sensing means, and
(b) the values of a first pair of said temperature sensing means to determine a first average temperature therefrom; and
second means for averaging:
(c) a second function of the average of the value of the temperature for each of said temperature sensing means, and
(d) the values of a second pair of said temperature sensing means to determine a second average temperature therefrom,
whereby two separate average temperatures of the temperature of the reactor coolant are determined for each of said two loops.

11. The measurement system as recited in claim 10 wherein said temperature sensing means are circumferentially spaced about the leg.

12. The measurement system as recited in claim 11 wherein said first pair of said temperature sensing means are separated by about 120 degrees and said second pair of said temperature sensing means are separated by about 180 degrees.

13. The measurement system as recited in claim 12 wherein one of said second pair of said temperature sensing means is separated by about 60 degrees from each one of said first pair of said temperature sensing means.

14. The measurement system as recited in claim 11 wherein said first pair of said temperature sensing means are separated by about 120 degrees and said second pair of said temperature sensing means are separated by about 60 degrees.

15. The measurement system as recited in claim 14 wherein one of said second pair of said temperature sensing means is separated by about 120 degrees from each one of said first pair of said temperature sensing means.

16. The measurement system as recited in claim 10 wherein said means for determining includes:
   means for collecting a plurality of values from each of said temperature sensing means; and
   means for averaging said plurality of values from each of said temperature sensing means to determine said average of the value of the temperature for each of said temperature sensing means.

17. The measurement system as recited in claim 16 wherein said first means for averaging includes means for determining a first bias value as a function of:
   (i) an average temperature of said plurality of values from each of said temperature sensing means for the corresponding leg, and
   (ii) the averages for said first pair of said temperature sensing means; and
wherein said second means for averaging includes means for determining a second bias value as a function of:
   (iii) said average temperature of said plurality of values from each of said temperature sensing means for the corresponding leg, and
   (iv) the averages for said second pair of said temperature sensing means.

18. The measurement system as recited in claim 17 wherein said means for determining the first bias value includes:
   means for determining the product of three times said average temperature of said plurality of values from each of said temperature sensing means,
   means for determining a sum of the averages for said first pair of said temperature sensing means, and
   means for determining the first bias value as said product less said sum; and
wherein said means for determining the second bias value includes:
   means for determining a sum of the averages for said second pair of said temperature sensing means, and
   means for determining the second bias value as said product less said sum of the averages for said second pair of said temperature sensing means.

19. A temperature measurement system for a nuclear steam supply system including a loop having reactor coolant with a temperature, said temperature measurement system comprising:
   plural temperature sensing means, each of said temperature sensing means for providing a value of the temperature of the reactor coolant;
   means for providing a first bias value associated with a first plurality of said temperature sensing means and a second bias value associated with a second plurality of said temperature sensing means;
   means for averaging the first bias value and the values of said first plurality of said temperature sensing means to determine a first average temperature therefrom; and
   means for averaging the second bias value and the values of said second plurality of said temperature sensing means to determine a second average temperature therefrom,
   whereby two separate average temperature values of the temperature of the reactor coolant are determined for said loop.

20. The measurement system as recited in claim 19 wherein said loop includes a hot leg having a circumference; and wherein said temperature sensing means are spaced about the circumference of the hot leg, with a first pair of said temperature sensing means being separated by a first angle and with a second pair of said temperature sensing means being separated by a second different angle.

21. A method for determining temperature measurements for a nuclear steam supply system including a loop having reactor coolant with a temperature, said method comprising the steps:
   employing a plurality of sensors to sense the temperature of the reactor coolant;
   sensing plural values of the temperature of the reactor coolant from each of the sensors;
   determining a first bias value associated with a first plurality of the sensors and a second bias value associated with a second plurality of the sensors;
   sensing a value of the temperature of the reactor coolant from each of the sensors;
   averaging the first bias value and the value of the temperature of the reactor coolant from the first plurality of the sensors and determining a first average temperature therefrom; and
   averaging the second bias value and the value of the temperature of the reactor coolant from the second plurality of the sensors and determining a second average temperature therefrom,
   whereby two separate average temperature values of the temperature of the reactor coolant are determined for said loop.

* * * * *